United States Patent [19]

Weid et al.

[11] Patent Number: 4,667,410
[45] Date of Patent: May 26, 1987

[54] CUTTING HEAD FOR A FILAMENT-TYPE CUTTER

[75] Inventors: Helmut Weid, Niederdreisbach; Gebhard Orthey, Nauroth, both of Fed. Rep. of Germany

[73] Assignee: Wolf-Gerate GmbH, Fed. Rep. of Germany

[21] Appl. No.: 810,327

[22] PCT Filed: Apr. 9, 1985

[86] PCT No.: PCT/EP85/00160

§ 371 Date: Dec. 5, 1985

§ 102(e) Date: Dec. 5, 1985

[87] PCT Pub. No.: WO85/04548

PCT Pub. Date: Oct. 24, 1985

[30] Foreign Application Priority Data

Apr. 9, 1984 [DE] Fed. Rep. of Germany ....... 3413336

[51] Int. Cl.$^4$ ............................................. A01D 50/00
[52] U.S. Cl. .................................... 30/347; 56/12.7; 56/295
[58] Field of Search ................... 30/276, 347; 56/12.7, 56/295

[56] References Cited

U.S. PATENT DOCUMENTS

| | | | |
|---|---|---|---|
| 4,104,796 | 8/1978 | Sheldon | 30/276 |
| 4,138,810 | 2/1979 | Pittinger | 30/276 |
| 4,183,138 | 1/1980 | Mitchell et al. | 30/276 |
| 4,254,550 | 3/1981 | Satoh | 30/276 |
| 4,285,127 | 8/1981 | Zerrer | 30/276 |
| 4,347,666 | 9/1982 | Moore | 30/276 |
| 4,352,243 | 10/1982 | Lombard | 30/276 |
| 4,426,780 | 1/1984 | Foster | 30/276 |
| 4,493,151 | 1/1985 | Mitchell | 30/276 |
| 4,566,189 | 1/1986 | Muto | 30/276 |

FOREIGN PATENT DOCUMENTS

| | | |
|---|---|---|
| 140634 | 5/1985 | European Pat. Off. |
| 3005968 | 8/1981 | Fed. Rep. of Germany |
| 2405003 | 5/1979 | France |

Primary Examiner—Jimmy C. Peters
Attorney, Agent, or Firm—Ostrolenk, Faber, Gerb & Soffen

[57] ABSTRACT

In a cutting head for an electric-motor-driven filament-type cutter the automatic adjustment of the length of the filament is effected in that intermittently a rotational movement occurs between a filament spool (36) and a sleeve (24) mounting said spool for axial displacement. The sleeve (24) is provided on the outside with locking cams and the filament spool on the inside with cams cooperating therewith. The sleeve (24) can be pushed in by hand against spring pressure to cancel the intermittent locking. For automatic filament adjustment a centrifugal adjustment is provided. For this purpose at least two radial ball slots (40) are provided between the housing portion (14) and a radial extension (48) of the sleeve (24) and in the ball slots balls (44) are guided which are adapted to be urged outwardly by centrifugal force. Since the height of the ball slot varies over an inclined plane (42), when the balls (44) move radially outwardly a spreading of the two parts (48, 14) takes place so that intermittent unlocking results. The individual rotational angle portions are limited by lower and upper cams which cooperate with a counter cam which is controlled by the displacement movement and cooperates alternately with the one or other cam, the sectionwise or intermittent angular displacement taking place by repeated switching on and off of the motor.

10 Claims, 6 Drawing Figures

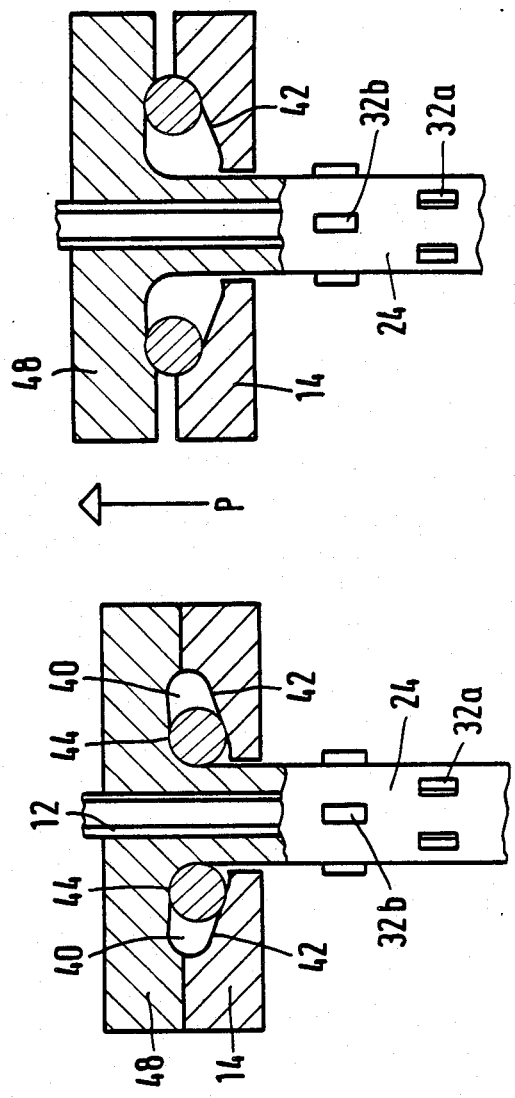

CUTTING HEAD FOR A FILAMENT-TYPE CUTTER

The invention relates to a cutting head of the type set forth in the preamble of claim 1.

In cord or filament-type cutters there is the problem of adjustment of the filament length because in particular on striking stones, edges and the like the rotating filament is cut or worn. Hitherto it was necessary to adjust the filament length in that a coupling between the filament spool and housing of the cutting head was released by pressing a button, whereafter the filament could be pulled out radially.

It is also already known to carry out an adjustment without switching off the motor. According to Gardena this is solved by stepping on a foot button disposed on the upper side of the housing and effecting an unlocking. This greatly reduces the cutting height of the filament, which continues to operate, and brown cut areas in the lawn result.

It is further known (Toro) to strike the filament box against the ground, a button facing the ground thereby effecting unlocking. In this case as well difficulties similar to those in the aforementioned construction are encountered because the cut height is reduced.

However, in all known arrangements the unlocking must be actuated by hand or foot. The invention is therefore based on the problem of providing a filament-type cutter in which the adjustment of the filament takes place automatically without additional manipulation.

The problem set is solved by the features set forth in the characterizing clause of claim 1. According to the latter, on each switching on and off of the motor a short filament length is advanced, the dimensioning being such that account is taken of natural wear. If under particular conditions the filament should be greatly shortened by striking a sharp object, by repeated switching on and off of the motor the filament can be successively advanced and this represents a substantial simplification because it is not necessary to actuate additional controls. With some experience the necessity of adjustment can be detected by ear because the speed increases greatly when the filament length is reduced.

It has been found that this automatic adjustment should for each switching on and off lie in a range of about 5 mm in each case and that in this manner normal wear can be compensated. However, it is also to be possible with the invention to make the arrangement such that the speed of rotation depending on the filament length still available provides a measure for the advance of the filament and thus the advance takes place only when the filament length must indeed be adjusted.

An example of embodiment of the invention will be explained hereinafter with the aid of the drawings, wherein:

FIG. 3 is a schematic view of the cutting head constructed according to the invention of a filament-type cutter in the rest position;

FIG. 4 is a sectional view of the cutting head corresponding to FIG. 3 in the rotating position;

Figure 1:
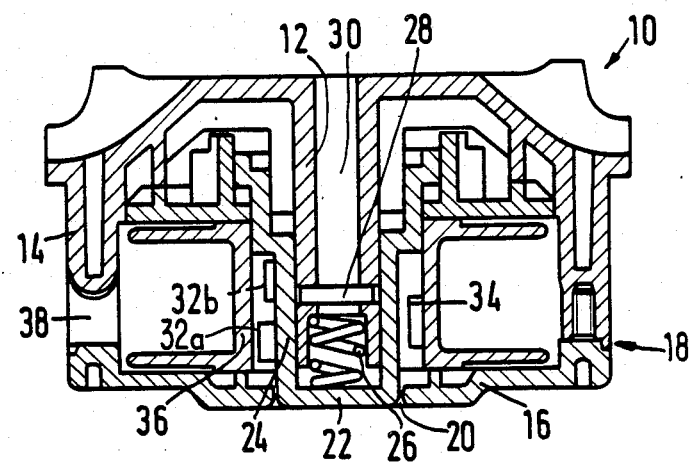
FIG. 1 is an axial section through a cutting head constructed according to the invention.
Figure 2:
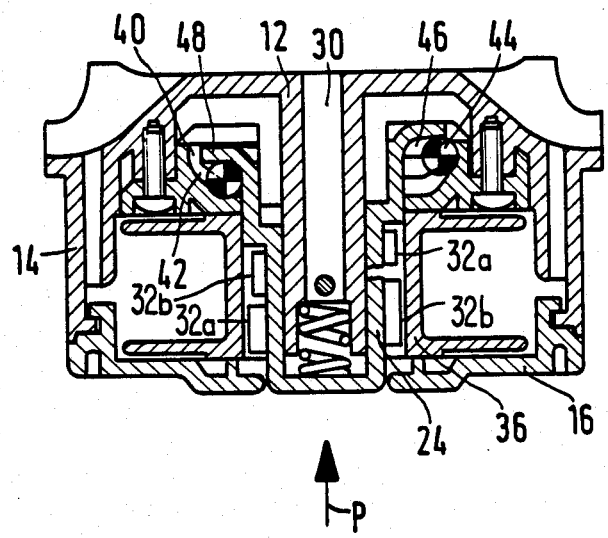
FIG. 2 is an axial section turned through 90° with respect to FIG. 1, the axis of rotation of the cutting head being shown on the left in the rest position and on the right in the rotating position.
Figure 5:
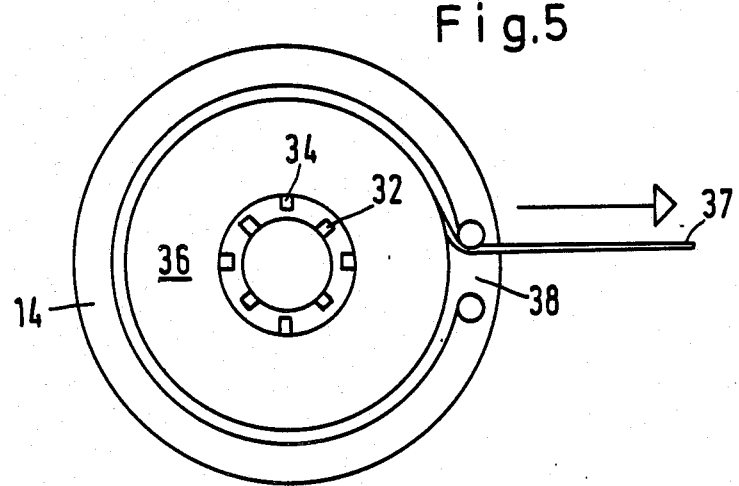
FIG. 5 is a schematic horizontal section of the cutting head according to FIGS. 3 and 4.

The cutting head 10 comprises according to FIGS. 1 and 2 a pot-shaped housing 14 which is integrally formed with a hollow hub 12 and which is closable by a cover 16 with a bayonet fastener 18. Said cover 16 faces the ground during cutting and comprises a central circular hole 20 through which the end face 22 of a sleeve 24 axially displaceable on the hub 12 is accessible. On the inside a pressure helical spring 26 bears axially on the end face 22 and the other end of said spring bears on a pin 28 which is inserted radially into the hub 12. The spring 26 lies in the cavity 30 of said hub 12. The sleeve 24 is provided on the outside with radially projecting locking teeth 32 which cooperate with inner locking teeth 34 (FIG. 5) of a filament spool 36 surrounding the sleeve 24 in a manner to be described hereinafter. (The section according to FIG. 1 is located such that none of the teeth 32 or 34 is sectioned). Through a radial opening 38 the cutting cord 37 wound on the spool 36 can emerge radially outwardly. After removal of the cover 16 the filament spool 36 can be withdrawn axially from the sleeve 24 and replaced by a new spool as is possible in known filament-type cutters.

As apparent from FIG. 2 the housing 14 comprises radial ball guide slots 40 with a lower inclined plane 42 and in each ball guide slot (according to the example of embodiment two diametrically opposite ball slots are provided) a ball 44 runs which bears at the top on a ball running face 46 which is disposed extending substantially horizontally on a radial extension 48 of the sleeve 24.

By movement of the sleeve 24 upwardly in the direction of the arrow P according to FIG. 2 the locking between the sleeve 24, which is non-rotatable with respect to the housing 14, and the filament spool 36 is cancelled over a predetermined arc portion. This unlocking can take place as hitherto usual in that the sleeve is depressed by finger pressure on the end face 22 after the cutting head is stationary and that then in the unlocked state a length of filament is unwound until after releasing the sleeve 24 the latter is returned by the spring 26 to the locking position.

The axial displacement of the sleeve 24 takes place however also automatically by the centrifugal force acting on the balls 44 when the cutting head rotates. To illustrate this principle attention is drawn to the fundamental drawings of FIGS. 3 to 6. In the rest position the sleeve 24 and with it the radial extensions 48 are depressed downwardly by the spring 26, whereby the balls 44 are moved to their radially inner position within the ball guide slots 40. When the cutting head rotates the balls 44 are moved outwardly by the centrifugal force and via the inclined plane 42 the sleeve 24 is raised with the portion 48 with respect to the actually fixed housing into the position according to FIG. 4. FIG. 3 corresponds to the shift position indicated in FIG. 2 on the left side of the axis whilst FIG. 4 represents the shift position on the right of the axis according to FIG. 2.

Figure 6:
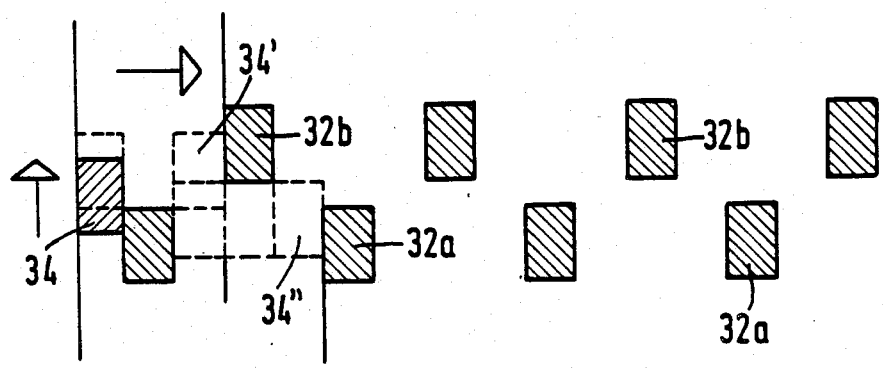
FIG. 6 is a development of the locking cam arrangement.

The positioning of the locking or drive teeth 32 and 34 is clearly apparent from the development of FIG. 6. Accordingly, on the sleeve 24 on the outside teeth 32a and 32b are disposed which are at different levels to each other and offset on the periphery and the hub of the filament spool carries on the inside in the centre level corresponding claw-like locking teeth 34.

By a relative axial displacement between the sleeve 24 and the filament spool 36 the movement sequence shown by FIG. 6 results. In the left end position the cutting head is shown in the rotating position. In this rotating position the sleeve is raised and is in the location according to FIG. 4. As a result the lower locking teeth 32a of the sleeve 24 are in engagement with the locking teeth 34 and via the latter entrain the sleeve. When the motor is switched off the sleeve 24 moves from the position of FIG. 4 to the position of FIG. 3 and the locking teeth 34 now assumes the position 34' shown in dash line in FIG. 6 and cooperates with the upper teeth 32b in positive manner. During this switching off operation the filament spool 36 was able to move a certain angular amount relatively to the bearing sleeve 54 and a filament length corresponding to this angular rotation can move outwardly under centrifugal force. When the switch is engaged again the balls 44 move under centrifugal force again outwardly and the cutting head returns from the position of FIG. 3 to the position of FIG. 4, the locking teeth 34 being moved into the position 34" in which a positive engagement again occurs between the teeth 34" and 32a. In this switching-on operation there was again a relative angular rotation between the sleeve 24 and the filament spool 36 so that a certain filament length again moves out.

By repeated switching on and off the filament can be extended until the necessary filament length is achieved which is limited in length by the filament end meeting a cutting edge fixed with respect to the housing and by the speed reduction due to the increasing of the filament length. This means that the lengthening is possible after the switching on again only if the speed exceeds the normal speed.

The arrangement illustrated in FIG. 6 can also be reversed, i.e. respective upper and lower teeth may be provided on the filament spool and the cams shiftable therebetween may be provided on the sleeve 24.

We claim:

1. A filament cutter, comprising:
    a rotatable cutting head, including a hub about which the head is rotatable; a guide hole in the head through which a filament exits the head;
    a filament spool in the head, including a filament wound on the spool, and the filament being directed from the spool to exit the head through the guide hole; the spool being free to rotate around the hub;
    a sleeve in the head which is disposed at the hub and which is supported in the head for rotating with the head; the sleeve being axially shiftable in the head along the hub;
    centrifugal means attached to the sleeve for shifting the sleeve in one axial direction with respect to the head as the head begins to rotate and rotates; biasing means for urging the sleeve to return in the opposite axial direction from the one direction as the head slows to stop rotating;
    first engaging means on the sleeve; cooperating second engaging means on the spool, such that when the first and second engaging means are in engagement, the rotating head rotates the sleeve, which rotates the spool, and when the first and second engaging means are out of engagement, the spool rotation is independent of the sleeve rotation for then unwinding filament from the spool; the first and the second engaging means being respectively so placed axially along the head that the first and second engaging means are moved into and out of engagement with axial movement of the sleeve, for causing the spool to temporarily rotate independently of the head while the first and second engaging means are out of engagement.

2. The filament cutter of claim 1, wherein the centrifugal means includes a ball guide slot in the head, the slot extending radially and also communicating with the sleeve, and includes a ball disposed in the slot, the slot being shaped and oriented and the sleeve including means such that centrifugal force caused by rotation of the head moves the ball along the slot and causes the ball to press upon the sleeve and to move the sleeve axially in the one direction against the urging of the biasing means.

3. The filament cutter of claim 2, wherein the ball guide slot is disposed axially above the spool and extends radially at least partially over the spool.

4. The filament cutter of claim 1, wherein the first and the second engaging means are placed axially along the head such that at slow rotation of the head, they are in engagement, at rapid rotation of the head they are in engagement, and they are disengaged as the head moves between faster and slower rotation.

5. The filament cutter of claim 4, wherein one of the first and the second engaging means includes a third tooth and a fourth tooth which are both axially spaced apart along the head and are respectively also spaced radial locations around the hub, and the other of the first and the second engaging means includes a fifth tooth which is axially so shaped and placed as to engage one at a time of the third and fourth teeth, depending upon the axial position of the sleeve in the head, whereby the spool may rotate independently of the head as the fifth tooth is moving between engagement with the third and fourth tooth.

6. The filament cutter of claim 5, wherein the sleeve is radially disposed inwardly of the spool.

7. The filament cutter of claim 6, wherein the third and fourth, axially spaced apart teeth are disposed on the outside of the sleeve, the spool surrounds the sleeve and the spool has an inside, and the fifth tooth is disposed on the inside of the spool.

8. The filament cutter of claim 5, wherein the third tooth is placed so that the fifth tooth engages the third tooth as the head is rotating and the centrifugal means moves the sleeve axially against the urging of the biasing means, and the fourth tooth is placed so that the fifth tooth engages the fourth tooth as the cutting head is slowed and the sleeve shifts axially under the urging of the biasing means.

9. The filament cutter of claim 1, wherein the sleeve is manually accessible for being manually shifted in the one axial direction of shift caused by the centrifugal means to enable the spool to be rotated independently of rotation of the head.

10. The filament cutter of claim 4, wherein the first engaging means includes a third tooth and a fourth tooth which are both axially spaced apart along the head and are respectively also at spaced radial locations around the hub, and the second engaging means includes a fifth tooth which is axially so shaped and placed as to engage one at a time of the third and fourth teeth, depending upon the axial position of the sleeve in the head, whereby the spool may rotate independently of the head as the fifth tooth is moving between engagement with the third and the fourth tooth.

* * * * *